United States Patent [19]
Lozoya

[11] 3,829,776
[45] Aug. 13, 1974

[54] PEN TYPE VOLTMETER
[76] Inventor: Elpidio Lozoya, 209 E. Railway, El Paso, Tex. 88045
[22] Filed: July 31, 1973
[21] Appl. No.: 384,224

[52] U.S. Cl. .............................. 324/122, 324/149
[51] Int. Cl. ...................... G01r 13/36, G01r 1/06
[58] Field of Search ........................... 324/149, 122

[56] References Cited
UNITED STATES PATENTS
| 3,315,163 | 4/1967 | Lutz | 32 X/149 |
| 3,694,749 | 9/1972 | Woroble | 32 X/122 |

*Primary Examiner*—Alfred E. Smith
*Attorney, Agent, or Firm*—Brady, O'Boyle & Gates

[57] ABSTRACT

A relatively compact voltage tester generally in the form of a pen or pencil adapted to be carried in a shirt pocket or the like and including a tubular casing with a spring biased connecting rod attached to a metallic probe, both being movably mounted in the casing with the probe projecting from one end thereof. The probe is applied to the circuit point to be tested whereupon the voltage appearing thereat is coupled across a selected strip resistor also carried in the casing. The rod is mechanically connected to a sliding contact member positioned against the strip resistor which then acts as a voltage pick off. The selected strip resistor and contact member comprise a potentiometer and is operable such that as the probe is depressed against the spring by pushing the casing toward the circuit point, a neon lamp lights at a certain depressed position. A pointer also coupled to the rod acts in combination with a calibrated scale on the outer surface of the casing to provide a reading of the voltage applied across the potentiometer.

10 Claims, 7 Drawing Figures

PATENTED AUG 13 1974 3,829,776
SHEET 1 OF 2
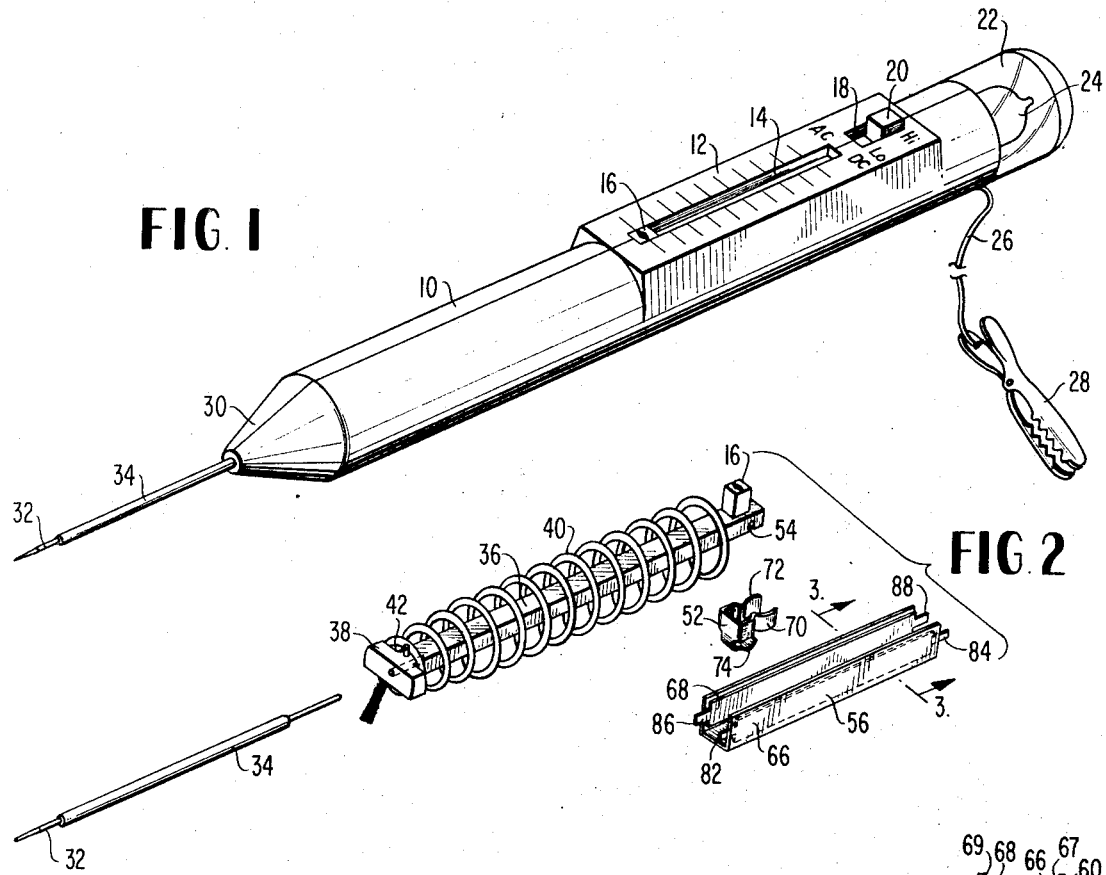
FIG. 1
FIG. 2
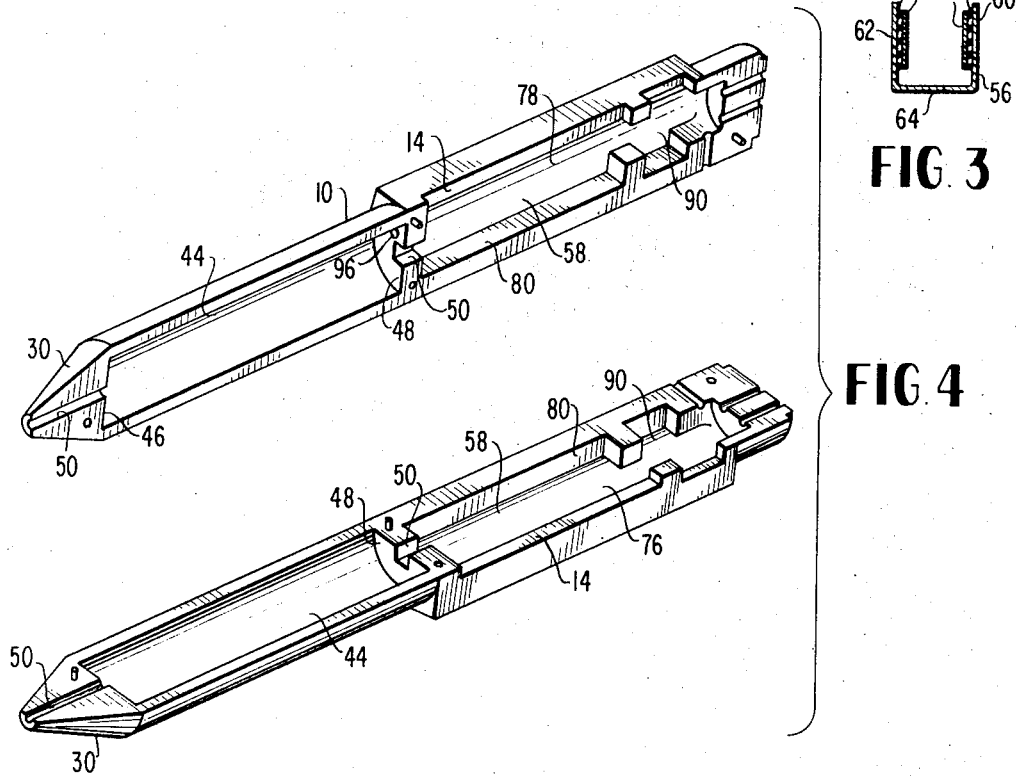
FIG. 3
FIG. 4

PEN TYPE VOLTMETER

BACKGROUND OF THE INVENTION

This invention relates generally to electrical testing instruments, and more particularly to a relatively small hand-held device for measuring electrical voltages, both AC and DC.

Test probes and hand-held test equipment of the type used by electronic technicians and the like for servicing and repairing electronic equipment are well known to those skilled in the art. Typical examples of such test apparatus is disclosed for example in the following U.S. Pat. Nos.:

3,555,420 — Schwartz
3,315,163 — Lutz
3,271,673 — Woroble
2,771,580 — Schott
2,632,785 — Knopp
2,426,050 — Radwanski While the Schott patent discloses a test probe having a retractable element, the Lutz patent additionally discloses a meter probe with a slidable circuit contact operated by a retractable tip for varying a plurality of switch positions and thereby provide selectable circuit interconnections for coupling to an external meter. While such apparatus appears to operate as intended, the present invention is adapted to provide a still further improvement in such test equipment.

SUMMARY

Briefly, the subject invention is directed to a shirt-pocket size hand-held voltmeter having a slender tubular body including spring biased connecting rod member attached to a contact probe. The contact probe and a ground lead attached to the body is selectively coupled across one of a pair of strip type resistors having a predetermined electrical resistance. Both strip resistors share a common contact with a metallic slide contact member which is mechanically connected to the rod member to act as a voltage pick off. The selected resistor and slider element thus act as a potentiometer coupled across the voltage to be measured. The slider element is connected to a neon indicator lamp having one side coupled to ground. As such when the voltage to be measured lights the neon lamp as the probe is depressed by pushing on the casing, an indicator element connected to the rod member points to a graduated scale which is calibrated in terms of voltage such that when the neon lamp lights, the indicator provides a reading of the voltage applied across the potentiometer.

BRIEF DESCRIPTION OF THE DRAWINGS

FIG. 1 is a perspective view of the preferred embodiment of the subject invention;

FIG. 2 is an exploded view of the elements contained in the casing shown in FIG. 1;

FIG. 3 is a cross sectional view taken across lines 3—3 of FIG. 2;

FIG. 4 is an exploded view illustrating the interior of the casing shown in FIG. 1;

DESCRIPTION OF THE PREFERRED EMBODIMENTS

Figure 6:
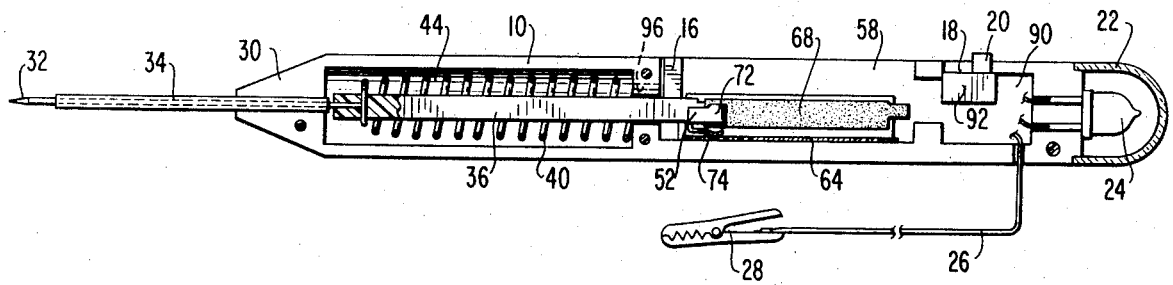
FIG. 6 is a longitudinal cross sectional view of an assembled embodiment of the invention shown in FIG. 1.

Referring now to the drawings, and more particularly to FIG. 1, reference numeral 10 denotes a relatively slender tubular casing comprised of electrical insulating material and adapted to fit into a shirt-pocket or the like when not in use. Dimensionally, it would be comparable in size to a pen or a pencil and thus does not occupy very large space. The tubular casing 10 has a flat rear portion 12 along the barrel which is adapted to contain a graduated scale for providing a visual reading of the magnitude of the voltage being measured by the instrument when in use. The flat portion 12 additionally includes a slot 14 wherein a mechanical indicator element 16 is adaptable to be located adjacent the scale. The flat portion 12 additionally includes a second slot 18 which is adapted to allow a switch actuator 20 to project therethrough for manipulation by the user. At the end of the tubular casing 10 adjacent the portion 12 is a transparent end cap 22 which conforms to the shape of the tubular casing 10 and is adapted to protect a neon lamp 24. At the same end of the casing 10 is located a ground lead 26 which terminates in a clip 28, referred to as an alligator clip. A conical end portion 30 exists at the other end of the casing 10 through which a retractable electrical contact probe 32 and an insulating sleeve 34 therefor are adapted to slidably project.

Referring now to FIG. 2, the contact probe 32 fits into one end of a connecting rod member 36. The rod 36 consists preferably of insulating maerial and is in the form of a member having a rectangular cross-section and having a forward flanged portion 38 which is adapted to receive the probe 32 therein. A compression spring 40 of approximately equal length is axially aligned with and over the rod member 36. The forward end 42 of the spring 40 terminates at the flange 38 and contact is made with the needle probe 32 thereat. Both the needle probe 32 and the spring 40 is comprised of electrically conductive material; therefore, electrical contact is made therebetween at the forward portion of the rod member 36 in the vicinity of the flange 38.

The connecting rod 36 and spring 40 combination is contained within a substantially circular bore 44 (FIG. 4) in the tubular casing 10 such that the flange 38 of the rod member 36 is adapted to abut the forward wall portion 46 by the urging of the spring 42 whose other extremity abuts the rear wall 48. The needle probe 32 and its associated insulating sleeve 34 is adapted to project through a small bore 50 in the conical portion 30 of the casing 10. The rear portion of the rod 36 is adapted to slidably fit through a channel 50 in the casing with an indicator element 16 (FIG. 2) secured near the end so that it can project upwardly through the slot 14. Thus pressure on the contact probe 32 will cause the probe and the rod member 36 to retract into the casing 10 causing the spring 40 to compress. Releasing the pressure will then cause the contact probe 32 and rod 36 to be urged forward by action of the compression spring 40.

Continuing further, a trifurcated or three fingered electrical slide contact member 52 shown in FIG. 2 is adapted to be secured to the electrically insulated rod member 36. The contact member 52 is adapted to fit into a small slot 54 located near the end of the rod member 36. The contact member 52 is adapted for relative movement linearly within a three walled channel member 56 which is adapted to be fitted into a recess 58 in the casing 10 behind the circular bore 44 and below the outer flat portion 12 of the casing 10 as shown in FIG. 1. The channel member 56 is shown for purposes of illustration in FIG. 3 and is comprised of electrically conductive material and includes a pair of side walls 60 and 62 and a bottom wall 64. Insulated from the side walls 60 and 62, are a pair of strip type electrical resistors 66 and 68 having predetermined different values of electrical resistance. The contact member 52 shown in FIG. 2, is adapted to be moved within the channel member 56 such that the finger contacts 70 and 72 slidably contact strip resistors 66 and 68, respectively, while the third finger contact 74 contacts the electrically conductive bottom wall 64. The configuration shown in FIGS. 2 and 3 is shown by way of illustration only, since the resistive strips 66 and 68 could, when desirable, be affixed directly to the inner side walls 76 and 78 (FIG. 4) of the recess 58 with an electrically conductive strip of substantially equal length to the resistive strips 66, 68 being formed on the bottom inner surface 80. Basically what is desired is that the contact member 52 be adapted to slide along the strip resistors 66 and 68 as shown in FIG. 5 which thus act as a pair of opposing resistance potentiometers having a common movable contact 74 therebetween such that when an electrical voltage to be measured is applied across either the ends of resistor 66 or the ends of resistor 68, a variable voltage pick off appears at the finger element 74 which is then coupled to the conductor 64'.

Figure 5:
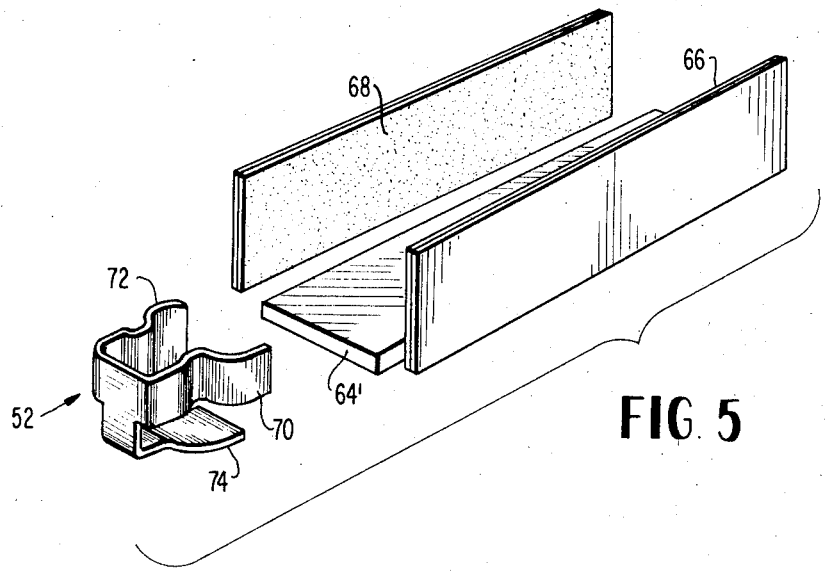
FIG. 5 is a perspective view of a basic arrangement of potentiometer elements for use in connection with the subject invention.

In addition to the circular bore 44 and the reces 58, the tubular casing 10 additionally includes a small chamber 90 wherein a two-pole double-throw electrical slide switch 92 is mounted, having its actuator 20 projecting through the slot 18 as shown in FIG. 5 which additionally illustrates a completed assembly of the invention. The chamber 90 additionally includes space for the necessary electrical wiring needed for providing the electrical circuit configuration which is shown schematically in FIG. 7.

Figure 7:
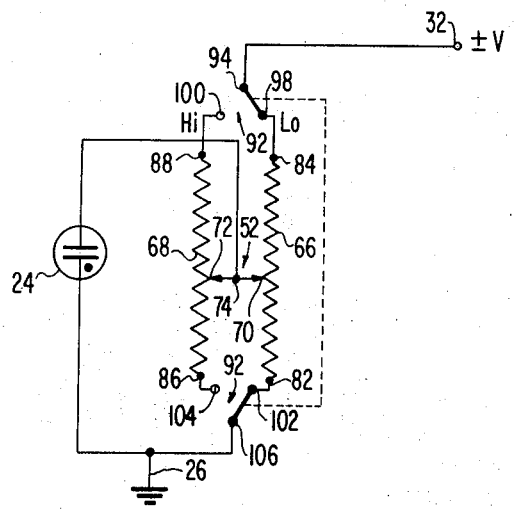
FIG. 7 is an electrical schematic diagram of the electrical circuitry associated with the subject invention.

Referring now to FIG. 7, the contact probe 32 is electrically connected to the movable switch contact 94 of one pole of the slide switch 92 by means of the spring 40 and a circuit connection which may be, for example, a wire soldered to the other end of the spring 40 and fed to the switch 92 through an opening 96 in the casing 10, which opening is shown in FIG. 6. The fixed switch contacts 98 and 100 are respectively coupled to the respective ends 84 and 88 of the strip resistors 66 and 68. The opposite ends 82 and 86 of the strip resistors 66 and 68, respectively, are connected to the fixed switch contacts 102 and 104 of the other pole of the slide contact 92 with the movable contact 106 thereof being connected to the ground return lead 26. The neon indicator lamp 24 is connected between the common slide contact 74, contacting the conductive member 64 and to the ground lead 26.

In operation, the two strip resistors 66 and 68 are selected to have predetermined different resistance values for two separate ranges of voltages to be selectively coupled thereacross by means of the switch 92. For example, in a first or low voltage position of the switch 92, a relatively low voltage to be measured is coupled across resistive strip 66 by means of switch contacts 94, 98 and 102, 106, whereas the second position of the switch 92 is adapted to couple a relatively higher voltage across resistive strip 68 by means of switch contacts 94, 100 and 104, 106. Depending upon the voltage to be measured, either AC or DC, the switch 92 is manually set at either the "Hi" or "Lo" position as shown in FIG. 1. The ground clip 28 is connected to ground potential and the contact probe 32 is placed against the voltage point to be measured. The casing 10 is then pushed towards the measurement point causing the casing together with resistors 66 and 68 to advance relative to the contact probe 32, the rod member 36 and the indicator 16. The slider contacts 70 and 72 accordingly move away from ground potential. At some point along the selected strip resistor 66 or 68 the potential existing between sliding contact 74 and ground exceeds the firing voltage of the neon lamp 24 which then lights. Accordingly the relative position of the indicator 16 which is mechanically coupled to the slide contact member 52 and the calibrated scale on the casing portion 12 provides an indication of the voltage existing between the ground clip 28 and the contact probe 32. The forward pressure of the casing 10 is stopped at the time the neon lamp 24 fires, at which time the desired voltage measurement is then read from the scale which has been previously calibrated during manufacture. Subsequent release of the pressure on the casing 10 causes the neon lamp to extinguish, at which time the contact probe 32 and rod member 36 assume the rest position due to the bias of the spring 40. The indicator 16 and the slider member 52 also assume the inactive position at the ground ends 82 and 86 of the strip resistors 66 and 68. As indicated, the range of voltage which can be measured is determined by the resistive value of the strip resistors 66 and 68; however, it is also dependent upon the firing voltage of the neon lamp 24. Accordingly, when desirable, a low voltage neon indicator having a self contained solid state generator which provides the high voltage necessary for excitation can be included. Such devices are well known to those skilled in the art, an example being a miniature neon "logilite" manufactured by Alcolite and identified as part No. LVN-ML-5V.

In summation then, what has been shown and described is a pen type voltmeter in the form of a dual slide potentiometer selectively coupled across the voltage to be measured with the slider being coupled to a neon indicator light which lights upon movement of the resistors relative to the slider caused by the downward pressure of the casing by the user at which time the position of a pointer on a graduated calibrated scale provides a reading of the voltage being measured.

The foregoing description of the subject invention is not meant to be considered in a limiting sense, as it is desired that all equivalents, alterations and modifications coming within the spirit and scope of the following claims is herein meant to be included.

I claim as my invention:

1. An electrical tester particularly adapted but not restricted to multi-range electrical measurements, comprising in combination:

a casing including a first and second axially aligned interior cavity and having a linearly extending graduated scale comprising calibrated indicia for providing a direct reading of the desired measurement located on the outer surface of said casing;

a retractable electrical contact probe mounted in and projecting from one end of said casing and constituting one terminal of an electrical measuring circuit;

single electrical conductor means extending from said casing and constituting the other terminal of said electrical measuring circuit;

spring bias means mounted in said first cavity and biasing said contact probe to a normally projected position;

a unitary linearly extending strip resistor element for a desired range of electrical measurement located in said second cavity;

an electrical slide contact member in electrical contact with said resistor element located in said second cavity;

an indicator element located in a slot in said casing adjacent said graduated scale and cooperating therewith to provide said direct reading of the desired measurement;

means mechanically coupling the contact probe, the slide contact member and said indicator element whereby the holding of the casing and applying the contact probe to a point of an electrical circuit being tested and then pressing the casing toward the point under test causes the casing together with the graduated scale and resistor element to advance relative to the contact probe, the slider element and the indicator against the action of the spring bias means;

an electrical lamp adapted to light upon the application of a predetermined voltage thereacross, mounted on the casing; and electrical circuit means coupling said resistor element, said slide contact and said lamp to said contact probe and said electrical conductor means providing a measuring circuit for an electrical parameter whereupon said lamp lights upon a selected pressing of said casing toward said point to be measured and the magnitude of the parameter being measured will be indicated by the relative position of said indicator element and the graduated scale.

2. The electrical tester as defined by claim 1 wherein said circuit means comprises:

first circuit means coupling said contact probe and said electrical conductor means across said resistor element, and second circuit means coupling said electrical lamp across said slide contact member and said electrical conductor means.

3. The electrical tester as defined by claim 1 and additionally including:

another unitary linearly extending strip resistor element located in said second cavity opposite said first-recited resistor element for another desired range of measurement;

an electrical conductor extending substantially parallel between said resistor elements;

wherein said slide contact member comprises a trifurcated contact member having three resilient electrical contact branches respectively adapted to contact said resistor elements and said electrical conductor; and wherein said electrical circuit means additionally includes switch means operable to selectively connect one of said resistor elements to said contact probe and said electrical conductor means.

4. The electrical tester as defined by claim 3 wherein said casing has a generally tubular shape of relatively small size for fitting into a pocket.

5. The electrical tester as defined by claim 1 wherein:

said casing is comprised of a relatively slender generally tubular body;

and wherein said spring bias means comprises a compression spring and said mechanical coupling means comprises a connecting rod member of nonconductive material extending through said compression spring, said compression spring and said rod member being located in said first cavity, said contact probe being mounted in one end of said rod member, and with said indicator element and said slide contact member attached to the other end of said rod member, said contact probe additionally being in electrical contact with said compression spring at one end thereof and said electrical circuit means being coupled to the other end of said spring.

6. The electrical tester as defined by claim 5 and additionally including a second linearly extending electrical resistor element located in said second cavity opposite from the earlier recited at least one resistor element with said slide contact member being in common electrical contact with both said resistor elements, and electrical conductor means located intermediate said resistor elements and being in electrical contact with said slide contact member.

7. The electrical tester as defined by claim 6 wherein said body includes a third cavity behind the second cavity and additionally including switch means located in said third cavity coupled to said electrical circuit means for selecting one of said resistor elements.

8. The invention as defined by claim 7 wherein said body includes a relatively flat body portion external to said second cavity, said flat body portion having the graduated scale thereon.

9. The electrical tester as defined by claim 1 wherein said casing is of a generally tubular shape, said spring bias means comprises a longitudinally extending compression spring electrically connected to said contact probe, said mechanical coupling means comprises a connection rod extending through said compression spring and having the contact probe secured to one end and said electrical slider member and said indicator element being secured to the other end.

10. The electrical tester as defined by claim 9 wherein said slider member comprises a trifurcated resilient electrical slide contact member;

additionally including a second linearly extending electrical resistor element; and a three walled channel member comprised of electrically conductive material having said at least one and said second linearly extending resistor elements mounted thereon and electrically insulated therefrom, and wherein said trifurcated slide contact member has one contact branch respectively contacting said resistor elements and said channel member.

* * * * *

UNITED STATES PATENT OFFICE
CERTIFICATE OF CORRECTION

Patent No. 3,829,776　　　　　　　　Dated Aug. 13, 1974

Inventor(s) Elpidio Lozoya

It is certified that error appears in the above-identified patent and that said Letters Patent are hereby corrected as shown below:

In Inventor's address at [76] of Title page, cancel "El Paso, Texas" and substitute therefor -Lordsburg, New Mexico-.

Signed and sealed this 12th day of November 1974.

(SEAL)
Attest:

McCOY M. GIBSON JR.　　　　　　　C. MARSHALL DANN
Attesting Officer　　　　　　　　Commissioner of Patents